US012615424B2

(12) United States Patent　　　(10) Patent No.: US 12,615,424 B2
Ricks et al.　　　　　　　　　　(45) Date of Patent: Apr. 28, 2026

(54) DYNAMICALLY ATTACH-/DETACHABLE REAR FACING TOUCHSCREEN VIEWFINDER FOR HIGH-RESOLUTION SMARTPHONE CAMERA SELF-AIMED PHOTOGRAPHY OR VIDEOGRAPHY

(71) Applicants: Kynan Alon Ricks, San Diego, CA (US); Abhimanyu Uberoi, Lake Oswego, OR (US); Jeremiah Stepan, Rolling Hills Estates, CA (US)

(72) Inventors: Kynan Alon Ricks, San Diego, CA (US); Abhimanyu Uberoi, Lake Oswego, OR (US); Jeremiah Stepan, Rolling Hills Estates, CA (US)

( * ) Notice: Subject to any disclaimer, the term of this patent is extended or adjusted under 35 U.S.C. 154(b) by 84 days.

(21) Appl. No.: 18/653,286

(22) Filed: May 2, 2024

(65) Prior Publication Data

US 2024/0373111 A1　　Nov. 7, 2024

Related U.S. Application Data

(60) Provisional application No. 63/464,620, filed on May 7, 2023.

(51) Int. Cl.
*H04N 23/53*　　　(2023.01)
*H04N 23/57*　　　(2023.01)

(52) U.S. Cl.
CPC ........... *H04N 23/531* (2023.01); *H04N 23/57* (2023.01)

(58) Field of Classification Search
CPC .............................. H04N 23/531; H04N 23/57
See application file for complete search history.

(56) References Cited

U.S. PATENT DOCUMENTS

| | | | |
|---|---|---|---|
| 8,825,124 B1 * | 9/2014 | Davies | H04M 1/185 |
| | | | 455/575.8 |
| 11,019,192 B2 * | 5/2021 | Harrell | H04M 1/0266 |
| 2004/0169769 A1 * | 9/2004 | Tatamiya | H04N 23/531 |
| | | | 348/E5.025 |
| 2008/0219656 A1 | 9/2008 | Staudacher | |
| 2012/0147220 A1 * | 6/2012 | Lee | H04N 5/772 |
| | | | 348/E5.022 |

(Continued)

FOREIGN PATENT DOCUMENTS

KR　　20160129632 A　　11/2016

OTHER PUBLICATIONS

Juli Clover, "Apple's Design Guidelines Give Accessory Makers Specific Details on Making MagSafe Products", Nov. 2, 2020, MacRumors, retrieved from https://www.macrumors.com/2020/11/02/apple-magsafe-design-guidelines-accessory-makers/ on Sep. 19, 2025 (Year: 2020).*

(Continued)

*Primary Examiner* — Timothy J Henn
(74) *Attorney, Agent, or Firm* — Plager Schack LLP; Mark H. Plager; Alexis Saenz

(57) ABSTRACT

A dynamically attachable and detachable electronic viewfinder device provides a duplicate electronic display for attachment to any camera-enabled device. This viewfinder device may be attached to the non-display (rear facing) side of the camera-enabled device without obstructing the view of any native factory-installed cameras, while providing a secondary user interface display that shows live imaging from the rear side cameras and provides auxiliary touch screen capability.

8 Claims, 4 Drawing Sheets

(56) References Cited

U.S. PATENT DOCUMENTS

| 2014/0129681 | A1* | 5/2014 | Gorilovsky ............. H04L 67/60 |
| | | | 709/219 |
| 2014/0141838 | A1* | 5/2014 | Cai ..................... H04M 1/0254 |
| | | | 455/575.8 |
| 2015/0042877 | A1 | 2/2015 | O'Neill et al. |
| 2016/0013829 | A1* | 1/2016 | Battle ................. H04B 1/3888 |
| | | | 455/575.8 |
| 2019/0250677 | A1 | 8/2019 | Dilaura et al. |
| 2020/0098498 | A1 | 3/2020 | Mora et al. |
| 2021/0328614 | A1* | 10/2021 | Shearer ................ H04B 1/3888 |
| 2022/0070363 | A1* | 3/2022 | Machuca ............. H04N 23/531 |
| 2023/0080516 | A1* | 3/2023 | Epstein ................ H02J 50/005 |
| | | | 320/108 |
| 2023/0308775 | A1* | 9/2023 | Desai ................... G06V 10/945 |
| 2024/0348709 | A1* | 10/2024 | Agrawal ........... H04M 1/72469 |

OTHER PUBLICATIONS

International Search Report and Written Opinion issued on Sep. 13, 2024 in corresponding international application No. PCT/US2024/028218; 7 pages.

* cited by examiner

DYNAMICALLY ATTACH-/DETACHABLE REAR FACING TOUCHSCREEN VIEWFINDER FOR HIGH-RESOLUTION SMARTPHONE CAMERA SELF-AIMED PHOTOGRAPHY OR VIDEOGRAPHY

CROSS-REFERENCE TO RELATED APPLICATIONS

This application claims benefit under 35 U.S.C. § 119(e) of U.S. Provisional Application having Ser. No. 63/464,620 filed May 7, 2023, which is hereby incorporated by reference herein in its entirety.

BACKGROUND

The embodiments herein relate generally to imaging systems, and more particularly to a dynamically attach-/detachable rearward-facing touchscreen viewfinder.

Conventional smartphones include a display on a single side of the chassis while cameras may be positioned on either or both sides of the chassis. For devices that include cameras on both sides of the chassis, the non-display (rear facing) side has one or more cameras that can capture higher quality images and videos (including multiple fields-of-view) than the single camera on the opposing display (front facing) side. The footprint on the front side of the chassis is encompassed by the electronic display in most iterations. The camera on the display (front facing) side usually uses a less powerful sensor which is of lower quality than the non-display side (rear facing) camera(s). This common configuration compels most users to take photos with their smartphones from the user's vantage point, which includes the primary display within the user's field of view. For users wishing to capture pictures or videos of themselves, they typically rely upon the display side (front facing) camera of the smartphone so that the primary display can be utilized as a live viewfinder. If a user wishes to utilize the more powerful, high resolution non-display side (rear facing) camera(s), they consequently lose the ability to use the primary display as a viewfinder.

SUMMARY

In one aspect of the disclosure, an apparatus for attachment to a computing device is disclosed. The computing device includes a processor, a front-facing side and a first camera on the front-facing side, an electronic display on the front-facing side, and a rear-facing side and a second camera on the rear-facing side. The apparatus includes an auxiliary electronic viewfinder display. A communication link couples the auxiliary electronic viewfinder display to the processor of the computing device. A mounting system is configured for attachable and detachable mounting of the auxiliary electronic viewfinder display to the rear-facing side of the computing device. The auxiliary electronic viewfinder display is configured to display an image captured by the rear-facing camera.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figures 7, 8, 9:
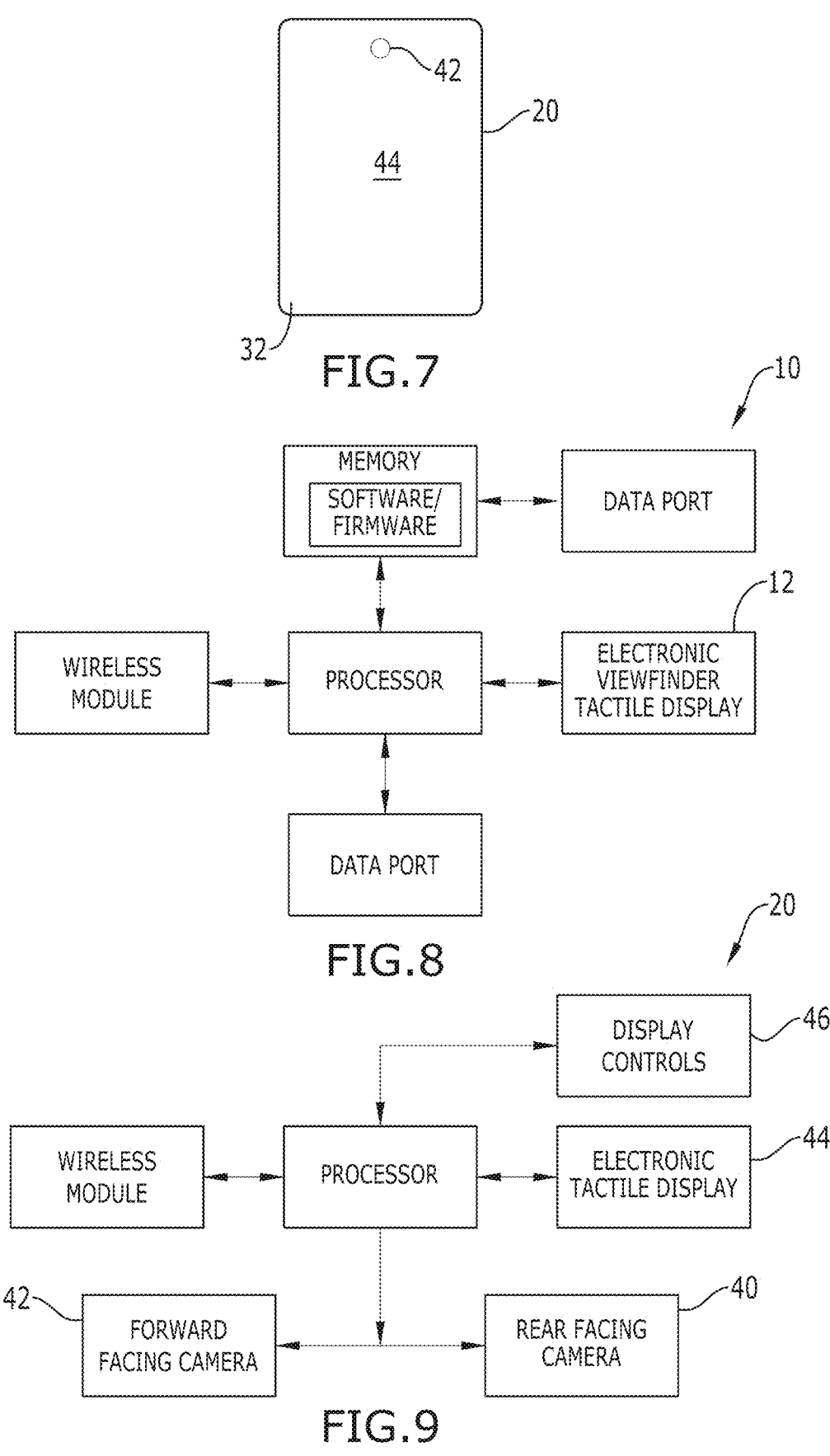
FIG. 7 is a front view of a computing device with a forward facing integrated camera in the system of FIG. 3, consistent with embodiments.
FIG. 8 is a block diagram of components in the viewfinder of FIG. 1, according to another embodiment.
FIG. 9 is a block diagram of components in the computing device of FIG. 7, according to another embodiment.

Referring to FIGS. 1-6, an apparatus 10 for attachment to a computing device 20 is shown according to an embodiment. For illustrative purposes only, the computing device 20 is shown as a smart phone, however, it will be understood that the benefits provided by the subject apparatus may extend to other computing devices with integrated cameras such as computing tablets and other portable computing devices. The apparatus 10 includes a dynamically attachable/detachable electronic viewfinder display 12 for coupling to the non-display (rear facing) side 34 of the computing device 20. As used herein the "rear" side is the non-display side, opposite the primary electronic display 44 (See FIG. 7) of a camera-enabled device. The subject electronic viewfinder display 12 addresses the problem of capturing clear and well-composed self-aimed pictures and/or videos, utilizing the higher-resolution and dynamic field-of-view non-display side 34 (rear facing) cameras as compared to display side 32, front facing cameras 42. Current smartphones lack a live display on the rear of the phone, which is instead generally located on the front-facing side 32. Thus, users are unable to grasp the smartphone ergonomically while previewing the frame to adjust the composition of an image/scene before taking a self-aimed picture or video with conventional camera-enabled devices. This situation forces users to use lower-resolution and poorer quality display side 32 front facing cameras 42 whose field of view is only viewable on a main electronic display 44 on the display side 32 in conventional devices. In some instances, users resort to various complicated setups for previewing images captured by a rear-facing side camera 40 of the device, requiring additional devices in such setups. Available duplicate smartphone screens cannot be used for non-display side (rear facing) camera self-aimed photographs or videos because their design, dimensions, and attachment options cause them to obstruct the existing non-display side (rear facing) cameras on smartphones or other electronic image capturing devices.

The subject apparatus 10 solves this problem by providing a solution that allows for easy and accurate preview of the frame and composition before capturing the image or video from the non-display (rear facing) side 34 smartphone cameras 40 in real time. The electronic viewfinder display 12 of the subject disclosure improves upon existing devices by specifically addressing the issue of self-aimed photography and videography utilizing non-display (rear facing) side 34 cameras 40, which other devices are not designed to do. The electronic viewfinder display 12 is a fully functional duplicate display/touchscreen that is dynamically attachable and detachable to/from the non-display (rear facing) side 34 of the smartphone (and/or protective phone case when used) which allows users the ability to see a real-time display of the non-display side (rear-facing) camera 40 feed and interact with it directly to take self-aimed photographs and/or videos. The dynamic attachability and detachability also allows the user to stow the electronic viewfinder display 12 during non-use.

In general, the electronic viewfinder display 12 includes an electronic display 15 that can be attached to the non-display (rear facing) side 34 of the computing device 20. Referring to FIGS. 3, 5, 6, and 9, the computing device 20 includes a processor, a front-facing side 32 and a first camera 42 on the front-facing side 32, an electronic display 44 on the front-facing side 32, a rear-facing side 34 with one or more second cameras 40 on the rear-facing side 34, and a data port 46 for power and data transmission.

Figure 1:
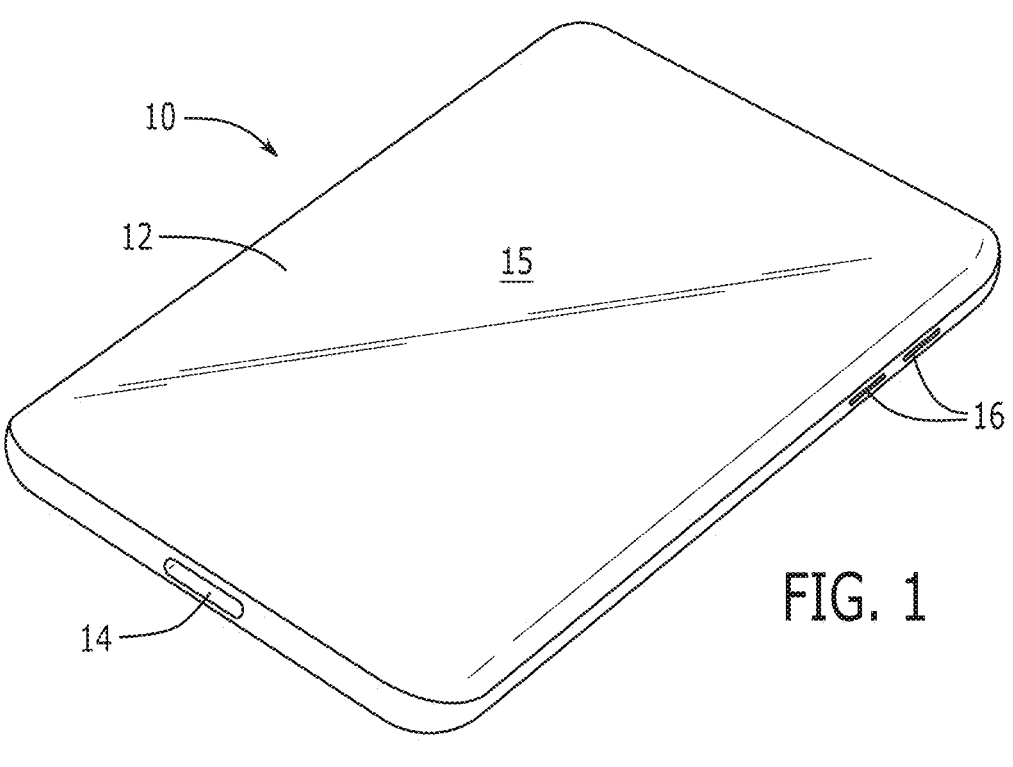
FIG. 1 is a front perspective view of a viewfinder device according to an exemplary embodiment.
Figure 2:
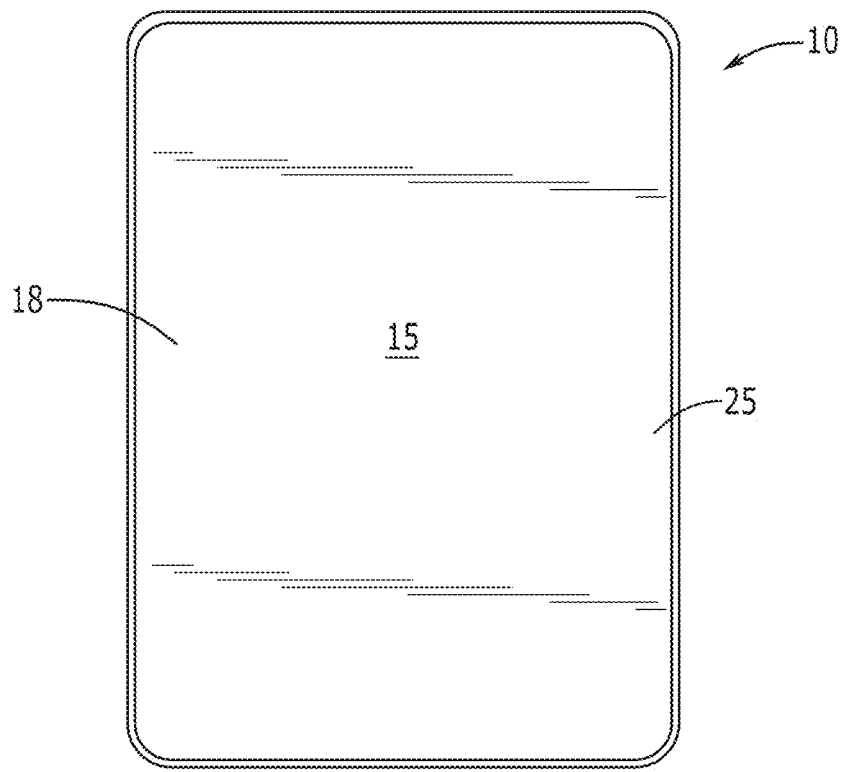
FIG. 2 is front view of the viewfinder of FIG. 1.
Figure 3:
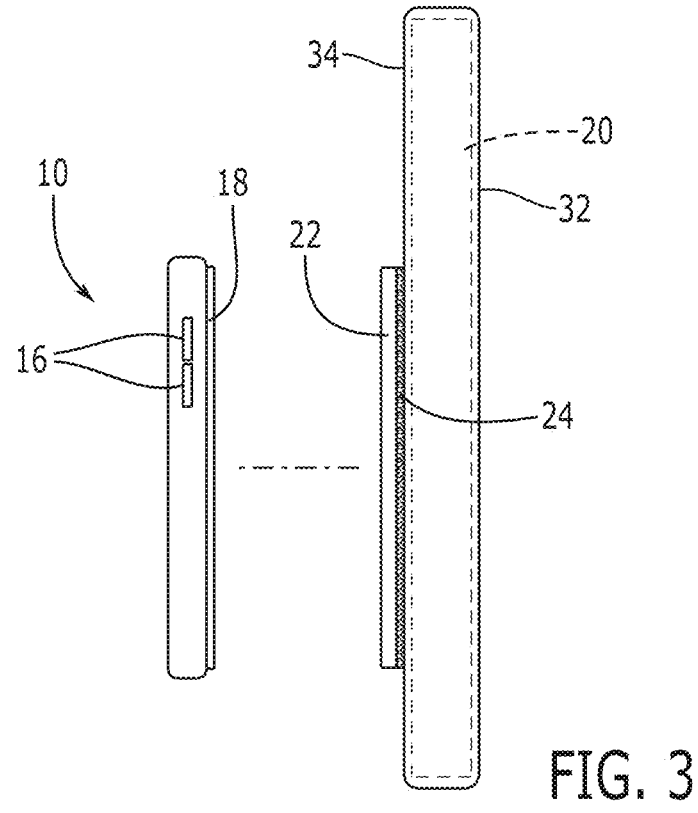
FIG. 3 is an exploded side view of a system including the viewfinder of FIG. 1 with a wired communication link attached according to an embodiment.
Figure 4:
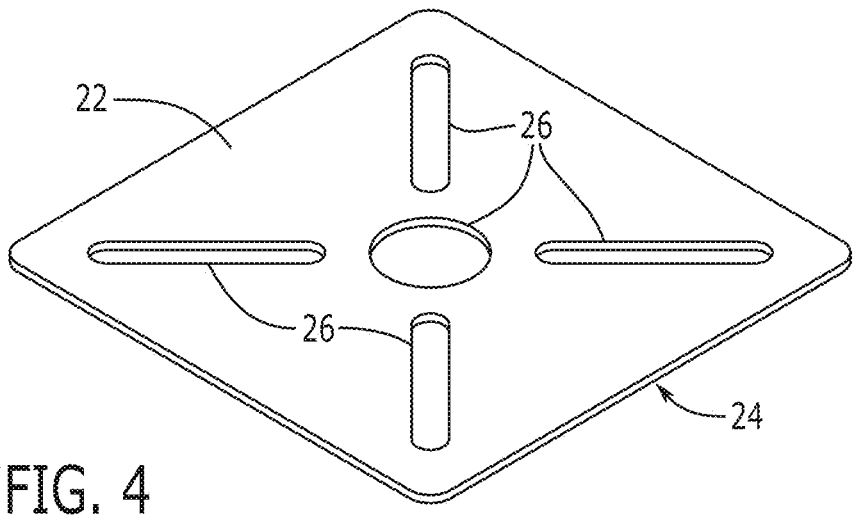
FIG. 4 is a perspective view of a stick-on magnet consistent with embodiments.
Figures 5, 6:
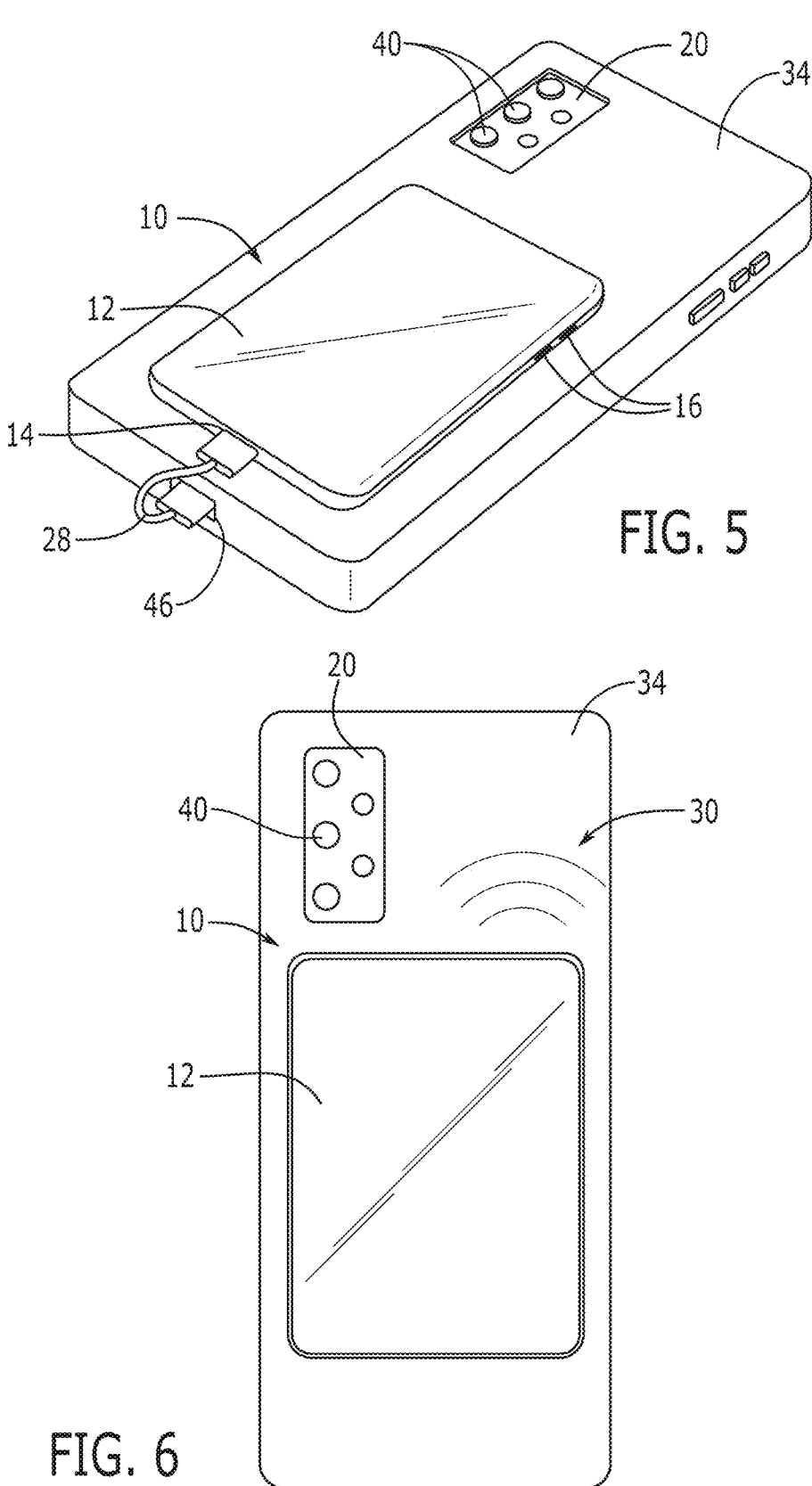
FIG. 5 is a rear perspective of the system of FIG. 3 consistent with embodiments of the subject disclosure.
FIG. 6 is a rear view of the system of FIG. 5.

In one embodiment, the electronic viewfinder display 12 may incorporate a metallic or integrated magnetic back 18 so that it can automatically couple the rear of the electronic viewfinder display 12 to a complementary stick-on magnet 22 mounted to the smartphone or case chassis (for example, by an adhesive 24 as shown in FIG. 3). In some embodiments, the magnet 22 may be a plate that includes slots or openings 26 for reducing the weight of the magnet 22.

The electronic viewfinder display 12 includes a communication link 28 that connects the electronic viewfinder display 12 to a processor (FIG. 9) in the computing device 20. In some embodiments, the communication link 28 is a cable that connects to a data port 14 of the electronic viewfinder display 12 to a data port 46 of the computing device 20. In some embodiments, the communication link may be wireless, in which case electronic viewfinder display 12 includes a wireless antenna module (FIG. 8) that can communicate a wireless signal 30 to a wireless module (FIG. 9) connected to the processor in the computing device 20.

In operation, the electronic viewfinder display 12 is a slave device that duplicates the output of the master or primary electronic display 44 of the computing device 20. For example, when attached to the non-display (rear facing) side 34 of a smartphone, a processor in the electronic viewfinder display 12 reads the data captured by the non-display side (rear facing) side 34 camera(s) 40. The image data may still be provided to the electronic display 44 of the computing device 20. However, the processor in the electronic viewfinder display 12 replicates the image data as a live feed displayed on the electronic display 15 of the electronic viewfinder display 12, showing the same field of view that is normally viewable in the master electronic display 44 of the computing device 20. In some embodiments, the image data captured by the rear-facing camera(s) 40 may be intercepted and displayed only on the display 15 of the electronic viewfinder display 12, preventing duplicative display of the scene on the computing device 20 so as to save power.

In some embodiments, the electronic viewfinder display 12 includes a touchscreen interface 25 that is configured for tactile input processing that allows the user to interact with the computing device 20 directly from the apparatus 10. For example, a user may access certain features or functions of the host smartphone (or other camera-enabled device) through a user interface that is replicated on the touchscreen type display 15 of the electronic viewfinder display 12 so that functionality (for example, image editing, image selection, etc.) can be accessed from the rear of the computing device 20 without having to flip the computing device 20 over to engage the primary electronic display 44. Some embodiments may include one or more buttons 16 on the electronic viewfinder display 12 (shown on an edge but may also be on a perimeter of the face of the electronic viewfinder display 12) that operate control(s) allowing the user to access additional features or functions such as power on/off, brightness control, and other settings.

The port 14 may in some embodiments be power ports for charging which provides the apparatus 10 to be powered and charged by various means (for example, via a smartphone power port, on-board battery, wireless charging, etc.). A power source(s) supplies the energy needed to power the apparatus 10 (which may be an integrated battery, capacitor, or other energy storage device). Some embodiments may include a wireless radio module that allows the apparatus 10 to communicate with the smartphone, or other devices or networks wirelessly. Some embodiments include various attachment option(s) that allow the device to be easily attached and detached from the rear side of the smartphone. Some embodiments include a remote control module that allows the user to control the apparatus 10 remotely (for example, through the wireless radio). The processor in the apparatus 10 may be programmed with a timer application that allows the user to set a timer for taking pictures or videos. The processor controls the operation of the apparatus 10. Memory stores the data, settings, and display controls of the apparatus 10. For example, a brightness control allows the user to adjust the brightness of the electronic viewfinder display 12. Software and/or firmware controls the operation of the apparatus 10 and allows the user to control the rear-facing smartphone camera 40 and to access different features and settings.

The subject device can be used in a different way or in another field of technology by utilizing the duplicate screen shown in display 15 as an additional display for the smartphone. By physically connecting the device to the smartphone or connecting wirelessly, the user can for example, increase the usable display area (i.e. desktop space) of the smartphone. This can be useful for multitasking, or for tasks that require a larger screen. The apparatus 10 may also be used to remotely control the smartphone within the wireless radio radius, for example to take pictures or videos using the rear-facing camera or to control the music player. Additionally, the apparatus 10 can be used as a detached, remote viewfinder for the camera image within the wireless radio radius, allowing the user to take pictures or videos from a distance with larger backdrops. The apparatus 10 may also be used as an interface for various video conferencing applications since the apparatus 10 can display the non-display side (rear facing) camera feed, allowing the user to see themselves during the call. The apparatus 10 may also be used to monitor multiple cameras at the same time.

As may be appreciated, the apparatus 10 allows for the capture of higher resolution photographs and videos when compared to current display side (front facing) cameras, by allowing the user to utilize the live non-display (rear facing) side 34 camera feed to adjust the camera angle, composition and settings accordingly. This results in a final product of higher quality photographs and videos, that are captured using the higher resolution non-display (rear facing) 34 camera of a smartphone or similar device.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An apparatus for attachment to a computing device, wherein the computing device includes a first processor, a front-facing side and a first camera on the front-facing side, an electronic display on the front-facing side, and a rear-facing side and a second camera on the rear-facing side, comprising:

an auxiliary electronic viewfinder display including a second processor configured to read image data captured by the second camera and replicate the image data as a live feed on the auxiliary electronic viewfinder display;

a communication link coupling the auxiliary electronic viewfinder display to the processor of the computing device; and a mounting system configured for attachable and detachable mounting of the auxiliary electronic viewfinder display to the rear-facing side of the computing device, wherein the auxiliary electronic viewfinder display is configured to display an image captured by the second camera on the rear-facing side of the computing device when attached to the rear-facing side of the computing device, and wherein the auxiliary electronic viewfinder display is configured as a slave device that duplicates output of the electronic display of the computing device.

2. The apparatus of claim 1, wherein the communication link is a cable.

3. The apparatus of claim 2, wherein the cable is configured to connect into a first port of the auxiliary electronic viewfinder display and to a second port of the computing device.

4. The apparatus of claim 1, wherein the communication link is a wireless antenna in the auxiliary electronic viewfinder display configured to communicate with a wireless communication module in the computing device.

5. The apparatus of claim 1, wherein the mounting system includes a magnet coupled to the rear-facing side of the computing device and the rear-facing side of the computing device is metallic or magnetic.

6. The apparatus of claim 5, wherein the magnet includes one or more slots.

7. The apparatus of claim 1, further comprising command buttons on the auxiliary electronic viewfinder display.

8. The apparatus of claim 1, wherein the auxiliary electronic viewfinder display includes a tactile input system.

* * * * *